March 29, 1966 L. O. CAUDILL 3,242,793
APPARATUS FOR THE AUTOMATIC REALINEMENT OF AN OPTICAL SYSTEM
Filed Feb. 4, 1964 4 Sheets-Sheet 1

INVENTOR.
LOUIS O. CAUDILL
ATTORNEY

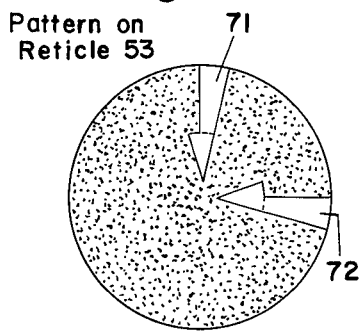
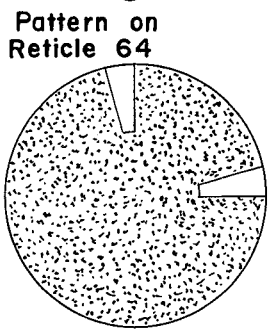
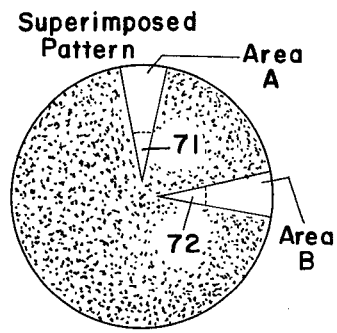
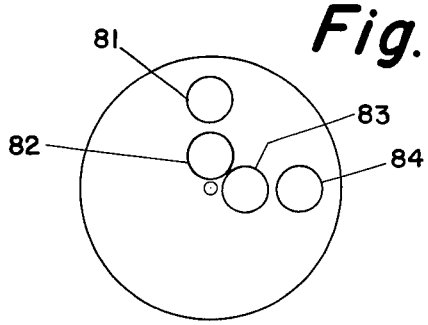
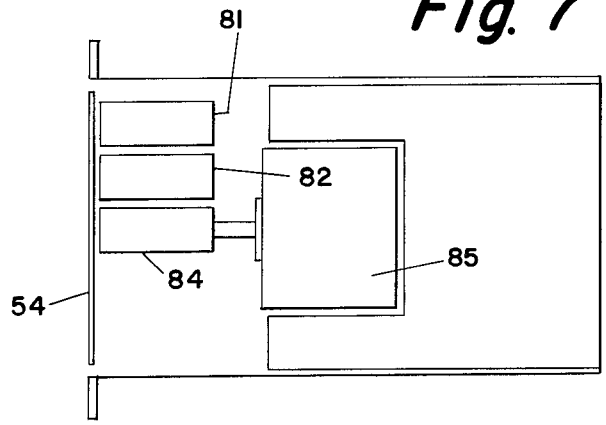

March 29, 1966 L. O. CAUDILL 3,242,793
APPARATUS FOR THE AUTOMATIC REALINEMENT OF AN OPTICAL SYSTEM
Filed Feb. 4, 1964 4 Sheets-Sheet 3
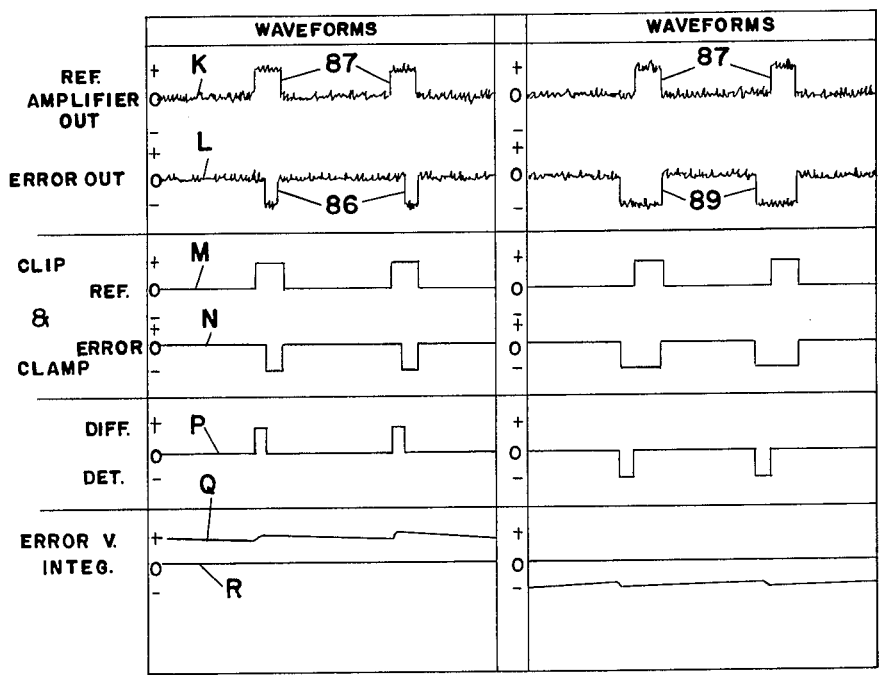
Fig. 5
Fig. 6
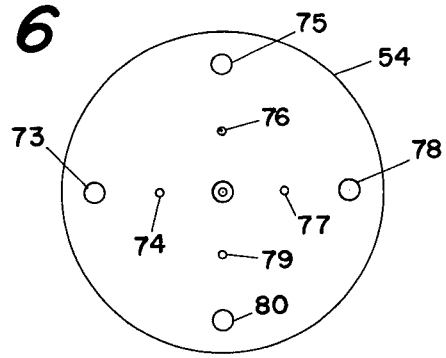
INVENTOR.
LOUIS O. CAUDILL
BY
ATTORNEY

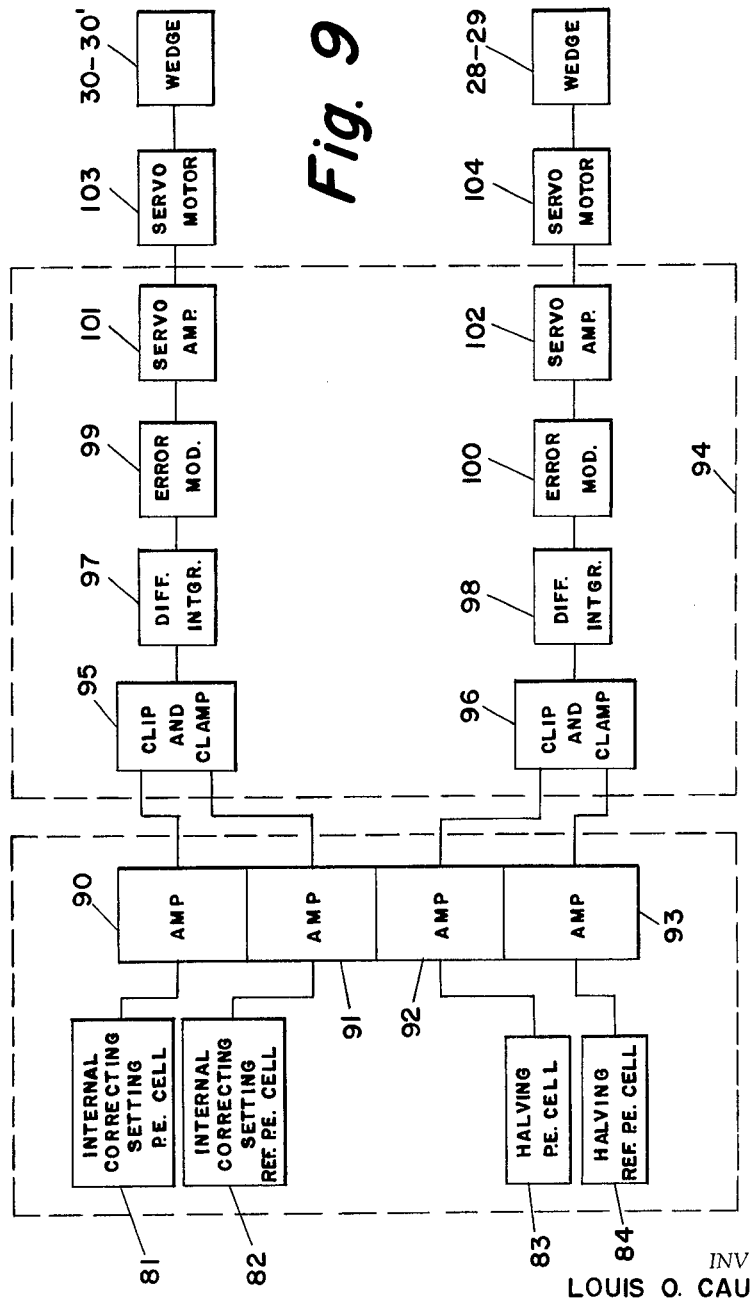

3,242,793
APPARATUS FOR THE AUTOMATIC REALINE-
MENT OF AN OPTICAL SYSTEM
Louis O. Caudill, Glen Burnie, Md., assignor, by mesne
 assignments, to the United States of America as represented by the Secretary of the Army
Filed Feb. 4, 1964, Ser. No. 342,577
2 Claims. (Cl. 88—2.7)

This application is a continuation-in-part of my application, Serial No. 179,819, filed March 14, 1962 for "Automatic Realinement of Optical Systems," now abandoned, and assigned to the same assignee hereof.

This invention relates to the correction of errors in an optical system and more particularly to an error correcting system whereby errors in an optical system are automatically detected and corrected by the movement of optical elements which form a part of the optical system.

The invention is illustrated as applied to a tank range finder. In the operation of such range finders it is frequently necessary to correct optical system errors resulting from temperature changes, mechanical stresses, and ballistic shocks encountered by the tank during its normal operation. Heretofore such errors have been corrected by manual adjustment of the optical system. Such procedure is unsatisfactory for the reason that it requires time and is not always as accurate as it should be. The present invention solves this problem by the provision of an error correcting system which promptly corrects the errors upon their appearance in the system.

The invention will be better understood from the following description when considered in connection with the accompanying drawings and its scope is indicated by the appended claims.

Referring to the drawings:

FIG. 1 illustrates a range finder optical system for tanks and the like.

FIGS. 2 and 3 represent reticles in the collimator of the optical system.

FIG. 4 illustrates the superimposed images of the two reticles of FIGS. 2 and 3.

FIG. 5 is an explanatory diagram relating to the operation of the error correcting system.

FIG. 6 depicts a scanning disk or chopper which scans images or patterns formed on the two reticles.

Figure 1:
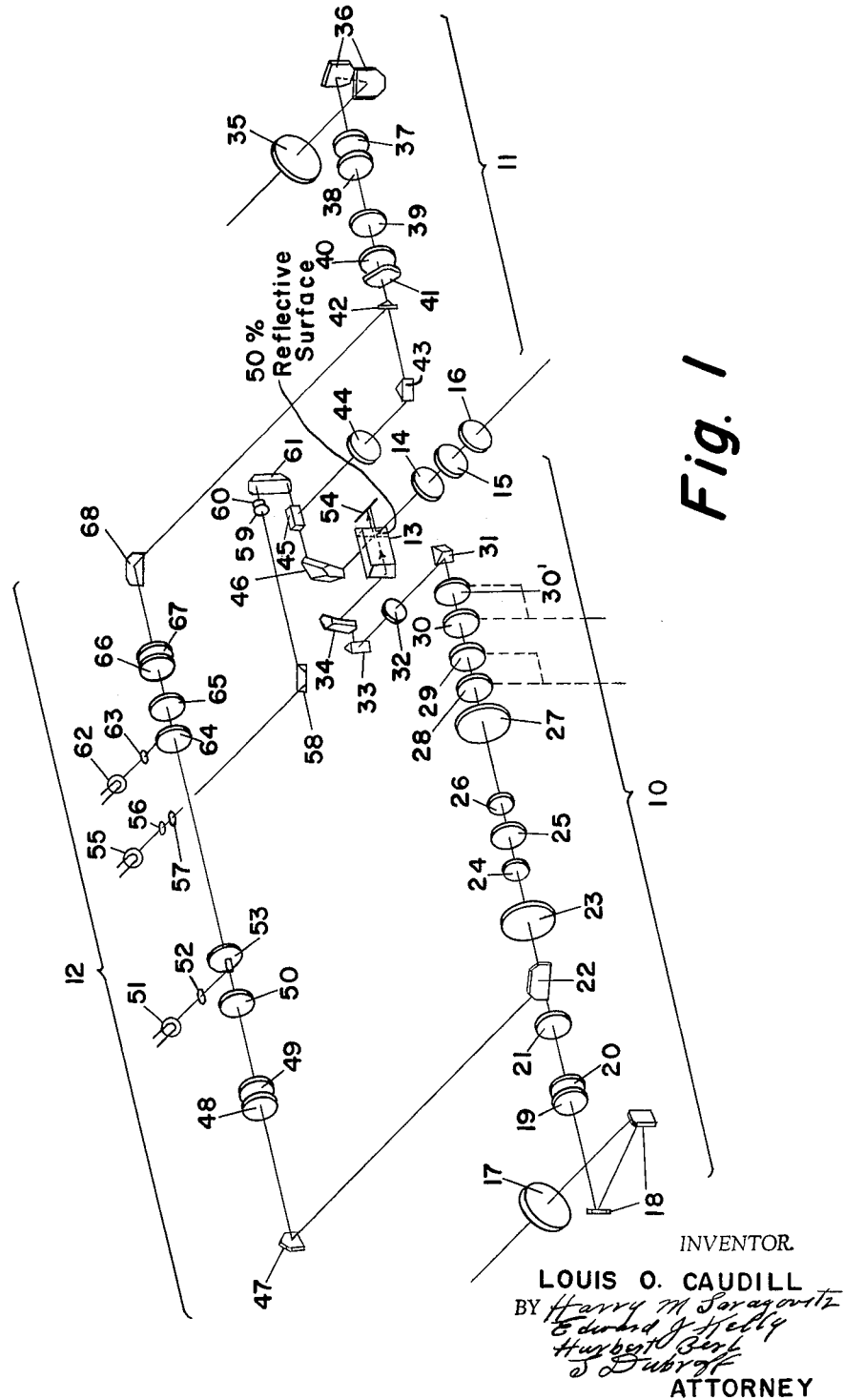

FIG. 7 indicates the physical relation between the scanning disk of FIG. 6 and the photocells associated therewith.

FIG. 8 is an end view of the photocell assembly, and

FIG. 9 is a block diagram illustrating the photocell output circuits which terminate in servo-motors utilized to adjust certain light wedges in the optical system.

The optical system of FIG. 1 is for the most part well known and is utilized herein to illustrate one of the several possible applications of the invention. This optical system includes a left telescope 10, a right telescope 11 and a collimator 12. Images from the two telescopes are transmitted through a combining prism 13, a diaphragm 14 and a field lens 15 to an eye lens 16 at which the operator views the images. As is well known, the range is obtained by rotating a range knob until both images, as seen by the operator are in co-incidence. In the particular optical system illustrated, the image on the right moves into coincidence with the image on the left.

The left image is transmitted through an end window 17, a penta reflector 18, a correction wedge 19, a protective window 20, a filter 21, a left porro reflector 22, a left objective lens 23, a collective lens 24, a gun laying reticle 25, a collective lens 26, an erector lens 27, corrective wedges 28, 29, 30 and 30', a 90° prism 31, an erector lens 32, a 90° prism 33 and an ocular prism 34. As hereinafter explained, the error correcting system of the present invention functions through the wedges 28, 29, 30, and 30' to eliminate errors, the wedges 28 and 29 being rotated together for correcting vertical errors and wedges 30 and 30' being rotated to eliminate horizontal errors.

The right image is transmitted through an end window 35, a penta reflector 36, a correction wedge 37, a protective window 38, a filter 39, a negative compensator lens 40, a positive compensator lens 41, a right porro reflector 42, a 90° prism 43, an objective lens 44, a beam splitter prism 45 and an ocular prism 46.

The collimator 12 includes a left porro reflector 47, left correction wedges 48 and 49, left collimator objective lens 50, lamp 51, diffuser disk 52, right reticle disk 53, lamp 55, diffuser disk 56, auxiliary gun laying reticle 57, mirror 58, auxiliary boresight collimator and objective lenses 59 and 60, porro prism 61, lamp 62, diffuser disk 63, reticle disk 64, right collimator objective lens 65, right correction wedge 66, horizontal correction wedge 67 and right correction wedge 66, horizontal correction wedge 67 and right reflector 68. The collimator is conventional except for the reticles 53 and 64.

These reticles have the patterns, images or configurations thereon indicated by FIGS. 2 and 3 and are superimposed by the combining prism 13 as hereinafter explained and shown on FIG. 4.

The reticle image from right reticle disk 53 mounted on the left side of the collimator is transmitted through left reticle disk 64 monuted on the right side of the collimator and, after a series of lenses, as shown, is reflected in porro reflector 42 of the right telescope and to the combining prism 13. Similarly, the reticle image from left reticle disk 64 is transmitted into the left telescope through right reticle disk 53 and reflectors 47 and 22.

The illustrated reticle configuration was selected for the reason that it is the prime function of the reticles to assist in providing a pulse having a width which is a function of the relative positions of the two reticles. It can be seen from FIGS. 2, 3 and 4 that Area A and Area B of the superimposed pattern of FIG. 4 is a function of the relative positions of the two reticles. The width of the sectors 71 and 72, however, is independent of the relative reticle positions since it is printed wholly on one reticle, that being reticle 53. It is also apparent that, within limits, regardless of the relative positions of the two reticles, the clockwise edge of Area A and Area B are derived only from reticle 53.

The form of the chopper 54 is indicated by FIG. 6. It is somewhat less than two inches in diameter and has perforations arranged in pairs 73–74, 75–76, 77–78, and 79–80 extending radially from the rotational center of the disk and displaced from one another by 90°.

Light from the reticles passes through the perforations of the disk 54 to photocells 81 to 84 as indicated by FIGS. 7 and 8, the disk being driven by a motor 85. As the outer scan holes 73, 75, 78 and 80 across Area A and Area B (FIG. 4) there results an inverted or negative pulse 86 (Waveform L) at the output of the photocell 81 or 84. The time duration of this pulse is a function of the width of Area A and Area B and the speed of the scanning motor. As the inner scan holes 74, 76, 77 and 79 cross sectors 71 or 72 from reticle 53 only, there is produced a positive going pulse 87 (Waveform K, FIG. 5) out of the photocell 82 or 83. The time duration of the pulse 87 is a function of the width and motor speed. As is well known to those skilled in the art, positive or negative pulses are produced at the photocell outputs by simply reversing the polarity for one cell or group of cells while the other cell or group of cells are left normal.

By way of further explanation, outer scan holes 73, 75, 78 and 80 of chopper 54 scan the superimposed Areas of A and B, the leading edge of which (clockwise scan) is derived from reticle 64 and the trailing edge from reticle 53. Therefore, duration of a pulse from any scan depends on the relative positions of reticles 53 and 64.

Since the trailing edge of the "Error Out" pulse (Waveform L, FIG. 5) coincides with the trailing edge of the "Reference" pulse from inner scan (Waveform M), the width of outer scan pulse (Waveform N) determines the relative position of its leading edges with respect to Waveform M. When the pulse of Waveform N is clipped and inverted as shown and added to Waveform M, a difference pulse (Waveform P) is produced which becomes the error signal.

Due to the configuration of the reticles, the clockwise edges of the positive and negative or inverted pulses correspond and the counter-clockwise edges of Area A and Area B are a function of misalinement. Since the sectors 71 and 72 are fixed in width they may be regarded as the reference bars and the signal produced by them as the reference pulses. If it is stipulated that, for proper alinement of the two optical trains, the time duration of the pulse from Area A or B must equal the time duration of the reference pulse, the motor is eliminated from inducing an error in the system due to speed variations. This is so for the reason that both the reference pulse 87 and the error pulse 86 are generated coincidently and their relative lengths remains the same. It therefore follows that the difference in the widths of the reference and error pulses is a direct indication of the magnitude of the misalinement of the optical system.

The waveform representations of FIG. 5 apply to either horizontal or vertical alinement errors. In the case of horizontal errors, the pulses 87 and 86 represent a misalinement in one direction and the pulses 87 and 89 represent a misalinement in the other direction. Similarly, in the case of vertical errors, the two sets of pulses represent errors in opposite vertical directions.

These pulses of light are applied to photocells 81 to 84 as indicated by FIGS. 7 and 8 and the outputs of these photocells are amplified by amplifiers 90, 91, 92 and 93. These amplifiers, together with a motor 85 which drives the chopper 54, are located in the range finder.

The output of the amplifier is transmitted to a separate assembly 94 where they are clipped and clamped by devices 95 and 96 to remove noise and to match amplitudes. This eliminates errors due to random noise and ensures a higher degree of accuracy in pulse length comparison.

The outputs are then fed to difference integrators 97 and 98 which perform two operations in one. It adds the two signals together and puts out a pulse whose sense and direction is a function of the relative pulse length of the error and reference pulses. It also integrates this output and develops a D.C. error voltage having a polarity and magnitude directly proportional to the horizontal or vertical error.

These D.C. error signals are modulated by modulators 99 and 100 whose outputs shift phase 180° for a polarity reversal of the error voltage. This phase reversible A.C. error voltage is then amplified by amplifiers 101 and 102 to enable it to drive the servo motors 103 and 104 which are coupled to the correction wedges 28, 29, 30 and 30' which are located in the left hand telescope 10 (FIG. 1) as previously indicated.

The wedges 28 and 29 are rotated by the servo motor 104 through a single gear (not shown). This gear is located between the two wedges and causes them to rotate in equal and opposite directions. Light rays entering the wedge 28 are bent toward its thickest part. Upon leaving the wedge 28 the rays enter the wedge 29 and are bent toward its thickest part. Due to the relationship between the thick sections or bases of the two wedges, a vertical vector resultant is formed which raises or lowers the left field of view and introduces vertical correction.

The wedges 30 and 30' are coupled to the servo motor 103 through a gear (not shown). These wedges receive light rays from the wedge 29. As motor 103 rotates, the wedges 30 and 30' rotate causing the light rays to be deviated in a horizontal direction, thus introducing horizontal correction.

The combining prism 13 (FIG. 1) is composed of a rhomboidal prism and a right angle reflecting prism. The hypotenuse of the right angle reflecting prism is cemented to the end of the rhomboidal prism and constitutes a 50% reflective surface, the rhomboidal prism being made up of a rectangular block of glass, with the upper and lower surfaces parallel, and the ends cut to a parallel 45 degrees. The combining prism 13 is so placed that light rays from right ocular prism 46 is permitted to pass directly through the combining prism whereas light rays from left ocular prism are reflected 90° by the uncemented end of the rhomboid, travel lengthwise through the rhomboid until they strike the 50% reflective surface, one-half of the rays being reflected 90° into diaphragm 14 and the other half into chopper disk 54. Light rays from the left optical system 10 are reflected to the eyepiece assembly by the rhomboidal prism component of the combining prism. The right angle reflecting prism eliminates any aberration that would be caused by the light from the right telescope 11 entering the slanted face of the rhomboidal prism. The combination of the right angle reflecting prism and the rhomboidal prism form a beam splitting prism unit which combines the left and right fields of view. This combined view appears both at the eye lens 16 and at the right hand end of the combining prism 13 where it is applied to the chopper 54 and utilized to correct misalinement of the optical system as previously explained.

I claim:

1. In a system for automatically correcting vertical and horizontal misalinement of an optical system having a left telescope, a right telescope and a collimator, said left telescope transmitting a left view and comprising a series of lenses and a pair of rotatable wedges for correcting horizontal misalinement in said system and a pair of rotatable wedges for correcting vertical misalinement in said system mechanically associated with said series of lenses, said right telescope transmitting a right view and comprising a series of lenses, said collimator comprising lenses and a right reticle and a left reticle, said left reticle comprising a round glass disk including a first pair of configurated patterns thereon, said patterns being generally similar in shape and size and circumferentially displaced from one another by about 90°, said patterns comprising substantially a pair of truncated isosceles triangles having their narrower inner portions generally slightly removed from a central portion of said disk, the "bases" of said triangles forming a portion of the periphery of said disk, and said right reticle comprising a round glass disk similar to said left reticle disk and including a second pair of configurated patterns thereon, said second pair of configurated patterns being generally similar in shape and size and circumferentially displaced from one another by about 90°, said second configurated patterns comprising substantially a pair of isosceles triangles having their apexes generally at a central portion of said disk, the "bases" of said isosceles triangles extending circumferentially generally intermediate the center and periphery of said right reticle disk and a tapered portion increasing in width from each of said isosceles triangle "bases" to said periphery of said right reticle disk, said tapered portions being radially disposed on a sector of said isosceles triangle "bases," such that when an image is transmitted from said left reticle, said tapered portions will be disposed on a clockwise sector of each of said isosceles triangle "bases," said right reticle and said left reticle being disposed in said collimator in adjacent parallel relation, means for transmitting the reticle patterns into respective telescopes, said first pair of configurated patterns on said left reticle and said second pair of configurated patterns on said right reticle providing a pair of superimposed images, each of said superimposed images being displaced from the other by about 90° and including an inner area and an outer area, said inner areas of said superimposed images being produced by said pair of isosceles triangles of said right reticle disk, and said outer areas of said superimposed images being produced by said tapered portions of said right reticle disk and said truncated isosceles triangles of said left reticle disk, one of said superimposed images being representative of vertical misalinement of the system and the other being representative of horizontal misalinement of the system, said system being alined when said superimposed images are wedge-shaped and misalined when said superimposed images are other than wedge-shaped, means for converting the superimposed images into phase reversible A.C. error voltages and means operable by said voltages to adjust said pairs of rotatable wedges to positions wherein said optical system is alined.

2. The system of claim 1 further characterized by said converting means including a rotatable chopper having perforations arranged in pairs along radial lines normal to one another with the inner perforation of each pair positioned to transmit light from the inner areas of the superimposed images and the outer perforation of each pair being positioned to transmit light from the outer areas of the superimposed images, photocells arranged in pairs adjacently operable said chopper, each of said photocells operable to produce a resultant output dependent on the difference between the widths of the inner and outer areas of said superimposed images.

References Cited by the Examiner

UNITED STATES PATENTS

| | | | |
|---|---|---|---|
| 1,813,673 | 7/1931 | Mihalyi | 88—2.7 |
| 2,696,565 | 12/1954 | Shockley | 88—14 |
| 2,857,816 | 10/1958 | Deal et al. | 88—2.7 |
| 2,901,941 | 9/1959 | Brumley | 88—1 |
| 2,927,216 | 3/1960 | Lohninger | 250—217 |
| 3,021,749 | 2/1962 | Merlin | 88—2.2 |
| 3,024,365 | 3/1962 | Smith et al. | 250—201 |

JEWELL H. PEDERSEN, *Primary Examiner.*

O. B. CHEW, *Assistant Examiner.*